United States Patent [19]

Koss et al.

[11] 3,912,440
[45] Oct. 14, 1975

[54] APPARATUS TO EXPAND A LAMINATING INTERLAYER

[75] Inventors: George A. Koss, Dearborn Heights; Daniel J. Gurta, Westland; Paul E. Tomshany, Dexter, all of Mich.

[73] Assignee: Ford Motor Company, Dearborn, Mich.

[22] Filed: Nov. 12, 1974

[21] Appl. No.: 523,089

[52] U.S. Cl. ............... 425/335; 425/363; 425/366; 425/384; 264/292; 264/288
[51] Int. Cl.² ..................... B29C 17/00; B29D 7/24
[58] Field of Search .......... 425/335, 363, 366, 384; 264/288, 292, 291

[56] References Cited
UNITED STATES PATENTS

| | | | |
|---|---|---|---|
| 2,559,648 | 7/1951 | Lindke | 425/366 X |
| 3,019,475 | 2/1962 | Smith | 425/335 |
| 3,696,186 | 10/1972 | Stark et al. | 264/288 X |
| 3,762,147 | 10/1973 | Wuest | 425/363 X |

*Primary Examiner*—J. Howard Flint, Jr.
*Attorney, Agent, or Firm*—William E. Johnson; Keith L. Zerschling

[57] ABSTRACT

An apparatus for expanding a laminating interlayer is taught. The apparatus includes structure for stretching a heated web of laminating interlayer material between a cylindrical heating structure and a conical member in such a manner that a constant rectangular plane is defined in the space between the point at which the web leaves the cylindrical structure and the point at which it contacts the conical member. The stretching of the web occurs between these two points because the web engaging the larger end of the conical member is stretched to a greater degree than the portion of the web engaging the smaller end of the conical member as the different ends of the conical member are moving at different surface speeds. The web is cooled on the conical member.

3 Claims, 3 Drawing Figures

APPARATUS TO EXPAND A LAMINATING INTERLAYER

BACKGROUND OF THE INVENTION

U.S. Pat. No. 3,696,186, issued on Oct. 3, 1972 for "A Method of Expanding Pliable Material" teaches a structure for expanding vinyl material which is used as an interlayer in laminating glass templets together in order to form an automotive windshield. This patent also discloses a structure for accomplishing the method described in the patent. This patent and U.S. Pat. Nos. 2,933,759 and 3,019,475 disclose methods and apparatuses for stretching a plasticized polyvinyl-butyral web used to form the interlayer of an automotive windshield. The stretching of such material is desirable when a tinted band is placed along one lateral edge of the material so that the material may be used in the formation of a tinted windshield for an automotive vehicle. More particularly, the tinted or gradient band is located at the top of the windshield in order to reduce the light transmission capability of the windshield in that area. This reduction in light transmission aids the operator of the vehicle by reducing the amount of glare he is subject to, thereby improving his field or vision.

When the gradient band windshield has both horizontal and vertical curvature, it is desirable to stretch each interlayer prior to placing it between two glass templets. This stretching is necessary so that upon lamination of the two glass templets with the interlayer, the edge of the gradient band across the windshield will appear as a straight, horizontal line when the windshield is assembled in an automobile. In its stretched condition, the interlayers for different windshield willl have the lateral edges thereof formed into curved configurations of different arc lengths. To facilitate the manufacture of the interlayer material, the material is produced in large rolls with the lateral edges thereof in a parallel and straight condition. Many individual interlayers may be formed from one such large roll of material.

The patents mentioned above show methods and apparatuses for stretching the original continuous length of interlayer material into a stretched condition to make it acceptable for use in a laminating procedure. The apparatus of this invention is an improvement over the apparatuses known in the prior art in that the present apparatus assures that the stretching forces applied to the material are always applied in a uniform and predictable ratio dependent only on the relative material contact points in the stretching apparatus. The control allowed by the present apparatus to the stretch gap geometry is superior to any known in the prior art.

SUMMARY OF THE INVENTION

This invention relates to an apparatus for expanding a continuous length of material and, more particularly, to an apparatus for expanding material so that originally parallel and straight lateral edges thereof are stretched to curved configurations of different arc lengths.

In accordance with the teachings of this invention, the expanding apparatus includes a heat drum in the form of a cylinder. First structure is provided for mounting the heat drum for rotation about its cylindrical axis. A heating device supplies heat internally of the heat drum. A first motor drives the heat drum so that the drum pulls the material to be expanded from a continuous supply thereof over a substantial portion of its cylindrical surface so that the material may be heated to a temperature whereat it is in an increasingly pliable condition. A first cooling cone having a slant height greater than the width of the material is mounted by second structure at a particular distance from the heat drum. The cooling cone is mounted in a position such that a selected slant height position along the cooling cone is in a parallel spaced relationship with respect to a selected tangent position along the cylindrical surface of the heat drum. This locating permits a rectangular plane to be defined in the particular distance between the selected slant height position and the selected tangent position between the head drum and the cooling cone. A cooling device is provided for cooling the interior of the cooling cone. A second motor drives the cooling cone. Electrical control circuits are provided for controlling the second motor so that the cooling cone supplies a stretching force to the material between the heat drum and the cooling cone. This stretching action causes the portion of the material engaging the larger end of the cooling cone to be stretched to a greater degree than the portion of the material engaging the smaller end of the cooling cone. The material to be stretched leaves the heat drum at the selected tangent position, is subjected to stretching stresses and relieving of such stresses during movement across the particular distance, and then is brought into contact with the cooling cone at the selected slant height position. The particular distance between the heat drum and the cooling cone is selected to be sufficient to accomplish a stretching of the material without disruption of its physical properties.

The apparatus of this invention stretches the material by the application of controllable stretching forces, that is by the use of the motor driving the cooling cone. The apparatus permits a substantial increase in speed of operation of such a stretching apparatus than heretofore achievable as well as permitting greater uniformity in the product regardless of the amount of stretching because of the ability to provide uniform heating and uniform cooling of the material prior to and after stretching.

DESCRIPTION OF THE PREFERRED EMBODIMENT

Construction

In the formation of an automotive safety windshield, a pair of glass templets are laminated together with an interposed sheet of plasticized polyvinyl butyral. The glass templets have an approximate thickness of 0.100 inch and the interlayer has a thickness of approximately 0.030 inch. The formation of such a laminated assembly is well known in the art. In many cases, it is desirable to include in the laminating interlayer a darkened or gradient tint band at the top portion thereof to reduce the amount of light which is allowed to enter into the automotive vehicle through the top portion of the windshield. This particular band is generally known as the gradient band and is preferably graduated with the intensity of coloration decreasing from the top of the windshield to a position spaced from the bottom thereof. Because most modern day automotive windshields have both a horizontal and a vertical curvature thereto, it is generally necessary to stretch the gradient vinyl to the proper curvature prior to laminating the vinyl with a pair of glass templets. More particularly, in order that the termination of the gradient tint line in the windshield appears as a uniform horizontal line when the windshield is installed in an automotive vehicle, it is necessary to stretch the interlayer material so that the upper and lower edges thereof each have a proper radius of curvature prior to lamination of the material. When the material is stretched, the lower portion of the gradient band is not horizontal. However, when the windshield is installed in an automotive vehicle, the angle of installation of the windshield is such that the bottom of the band will appear as a straight line when viewed from the exterior of the automobile.

Figure 1:
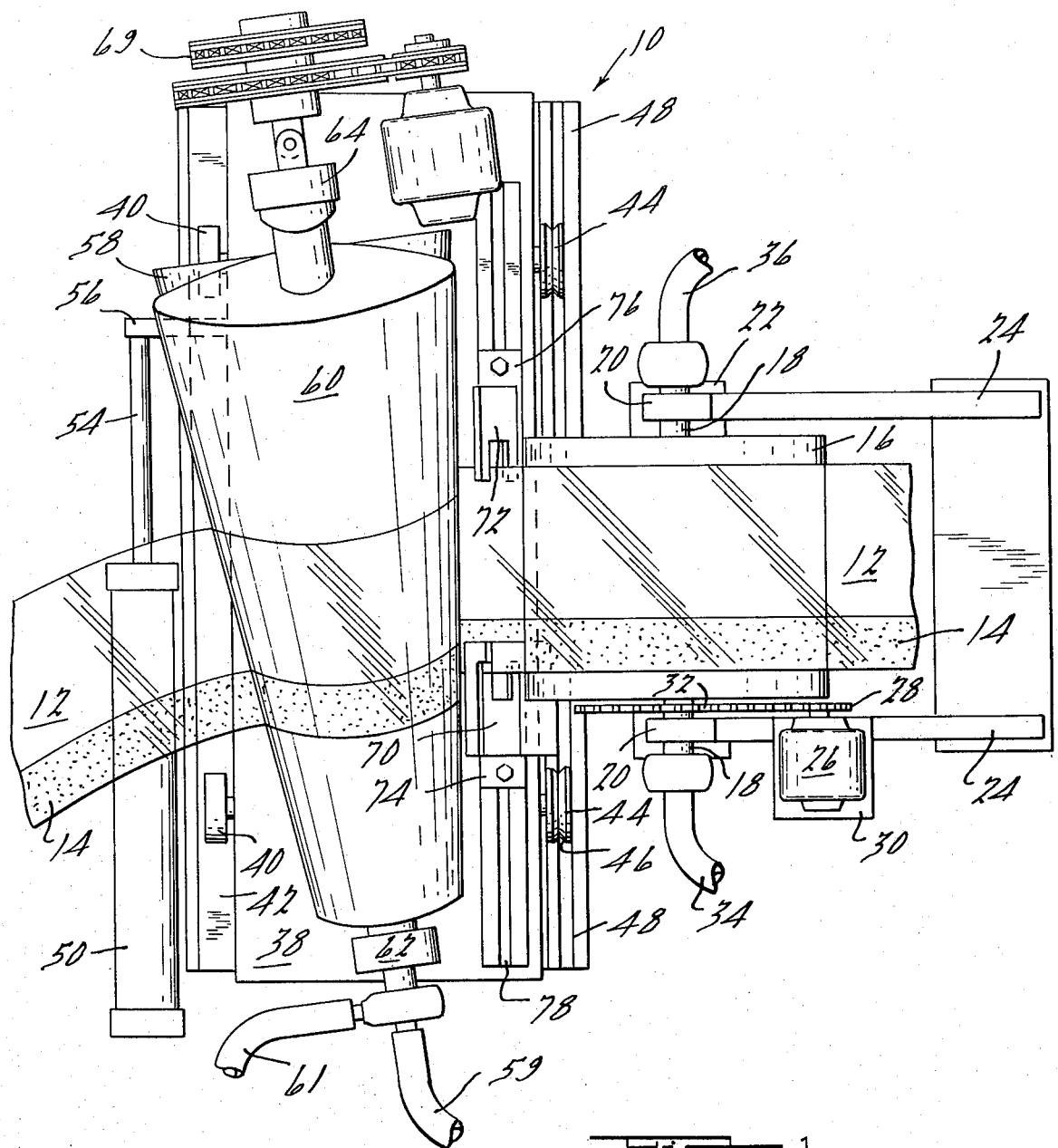
FIG. 1 is a plan view of the apparatus of this invention.
Figure 2:
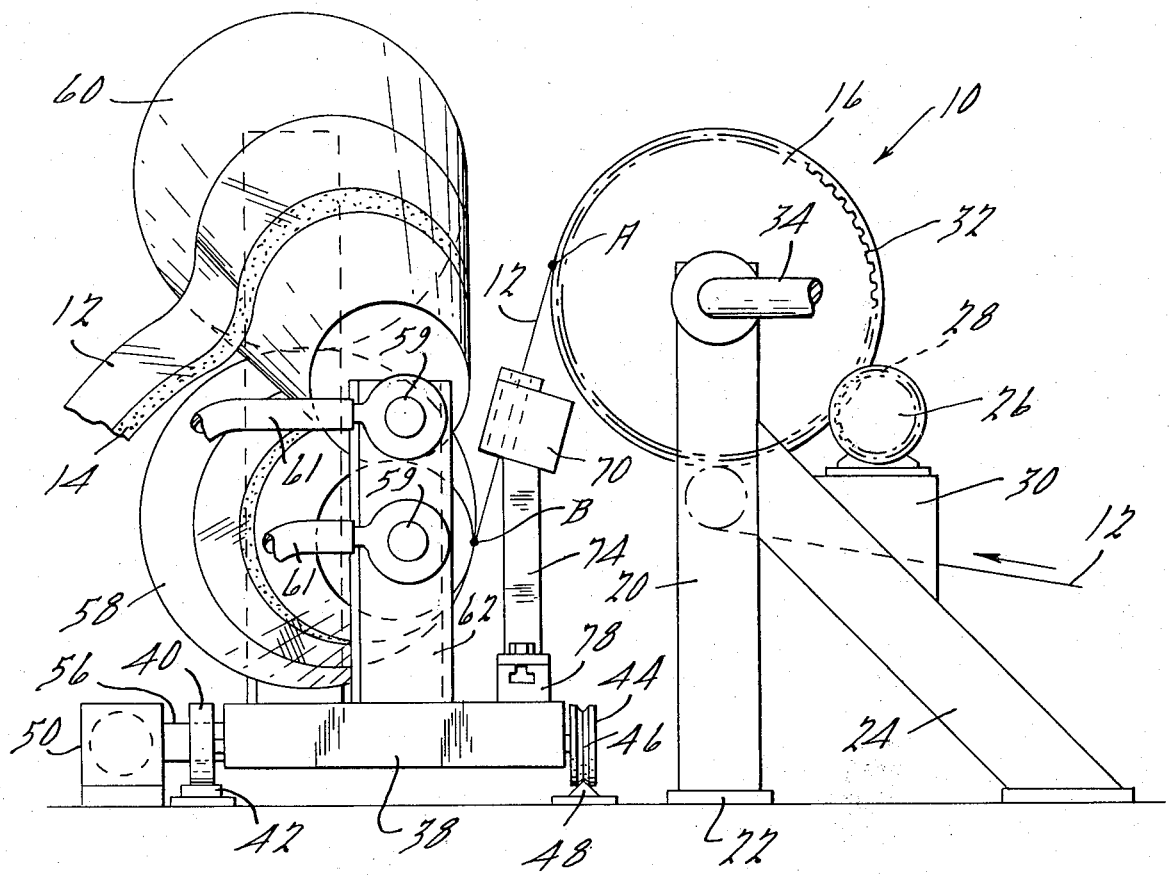
FIG. 2 is a side elevational view of the apparatus of this invention.

The vinyl material used for the interlayer, as purchased, is in a continuous roll wherein the opposite lateral edges thereof are in a substantially parallel relationship. As a final expanded product, finite lengths of the interlayer are formed from the roll in such a configuration that the upper and the lower lateral edges of the interlayer are stretched to curved configurations of different arc lengths. The upper edge of the gradient band interlayer is of shorter arc length than the lower edge thereof The apparatus for stretching such material will be best understood by reference to the associated drawings wherein the apparatus is generally identified by the numeral 10. With reference to FIGS. 1 and 2 of the drawings, a continuous roll of commercially available, polyvinyl butyral 12 is shown as it is unwound from a coil thereof (not shown). The roll of vinyl is formed so that one edge thereof has a gradient tinted band 14 thereon. The vinyl material is unrolled and put through a plurality of rinsing solutions at a rinsing station (not shown). At such a rinsing station, water is used to wash from the surface of the vinyl fine dust material which is placed thereon in order to keep the various convolutions of the material in the roll separate during its handling and shipping.

After passing through the rinsing station, the web 12 is passed around a drum 16 which is mounted for rotation on a shaft 18 which is supported by a pair of upstanding members 20. The upstanding members are secured to a bass plate 22 and are further supported by a brace member 24. A motor 26 is provided which drives a gear 28. The motor is mounted on support structure 30 associated with one of the brace members. The gear 28 engages a gear 32 secured to the drum.

The shaft 18 supporting the drum 16 has a hollow interior and only extends a portion of the way into the drum on each side thereof. The drum is a completely sealed unit having a hollow interior. An inlet pipe 34 and an exhaust pipe 36 are connected at opposite ends of the shaft so that a heating medium may be supplied to the interior of the drum. The heating medium heats the vinyl material which is passing over the surface of the drum.

Adjacent to the drum 16 and heating structure therefor is a movable platform 38. As best seen in FIGS. 1 and 2, the left side of the movable platform has a pair of support wheels 40 which are movable over a track 42. The right side of the movable platform is supported by guide wheels 44 having a groove 46 therein which locates the wheels on a guide track 48. A hydraulic cylinder 50 operates a piston which has a rod 54 associated therewith. The rod has a coupling member 56 which connects it to the movable platform. The hydraulic cylinder, by movement of its piston, is effective to operate the movable platform to position it in different positions with respect to the drum. The manner in which the hydraulic cylinder is operated to cause movement of the plantform is described in copending U.S. patent application Ser. No. 489,272, filed Aug. 5, 1974 and entitled "Apparatus For Expanding A Laminating Interlayer", which application is assigned to the same assignee as this application and is hereby incorporated by reference.

A lower cooling cone 58 and an upper cooling cone 60, both truncated, are shown in the drawings as being rotatably mounted by a front standard 62 and a rear standard 64 to the movable platform 38. While two cooling cones are shown in the drawings, any number of cooling cones may be employed with the apparatus 10 of this invention. For example, one or more cooling cones may be employed depending upon the amount of cooling which is necessary to cool the vinyl material which has been stretched. The cooling is carried out by allowing cooling fluid to flow into the cone through inlet pipes 59 and be removed therefrom through exhaust pipes 61. Preferentialy the cooling fluid, while in its coolest condition, contacts the smaller end of the cone and proceeds toward the larger end of the cone. The purpose of this preferential type of cooling action will be described hereinbelow.

As seen in FIG. 1, a motor 66 has a chain drive 68 associated therewith. The chain drive drives the lower cooling cone 58 and a second chain drive 69 driven by a reversing gear on the lower cooling cone, drives the upper cone 60 so that both cones are driven at a desired rotational speed. The motor and chain drives are secured to the movable platform 38 for movement therewith.

As is also best seen in FIG. 1, a first gauging head 70 and a second guaging head 72 are mounted by posts 74 and 76, respectively to the movable platform 38. These gauging heads may be moved any place along a gauging track 78 so as to accomodate the width of the vinyl passing therethrough. The gauging heads may be adjusted so that they are associated with different positions along the slant height of the cones 58 and 60. The gauging heads are adjusted by loosening the bolts which secure their posts to the gauging track. The gauging heads are designed to locate the edge of the web and to keep it in a particular position with respect to a location on the cooling cones which has been selected for stretching the vinyl to a particular configuration having certain desired upper and lower radii of curvature. The exact manner in which the heads function to accomplish this purpose if fully described in the aforementioned patent application.

Figure 3:
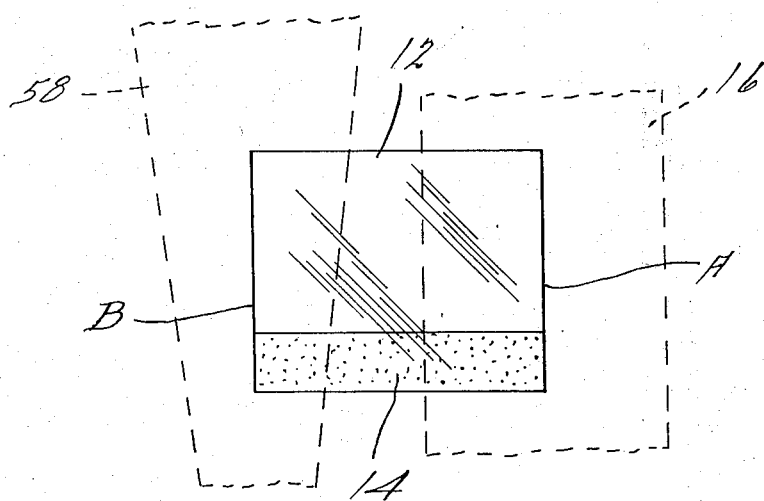
FIG. 3 is a schematic representation of the material being subject to stretching forces. This Figure shows the rectangular attitude taken by the material during its passage between the heating and cooling portions of the stretching apparatus.

In FIG. 3 there is graphically illustrated the position the vinyl assumes as it is being stretched between the heating drum 16 and the first cooling cone 58. The drum and cooling cone are shown in FIG. 3 on phantom. The material leaves the heating drum at a tagent position indicated by line A in FIG. 3 and point A in FIG. 2, moves across a zone in which it maintains a substantially rectangular attitude, and contacts the lower cone 58 at a selected slant height position indicated by the line B in FIG. 3 and point B in FIG. 2. The material in the zone maintains a substantially rectangular shape but may neck down slightly at a location close to the heat drum because of the stretching forces applied thereto. The larger end of the cone will apply a greater stretching force because the surface speed of the larger end is greater than the surface speed of the smaller end.

OPERATION

The operation of the apparatus of this invention will now be described in detail. The web 12 of commercially available plasticized polyvinyl-butyral is used as the interlayer material. This material is commercially available in lengths of 800 and 1500 feet with various widths, for example of about 30 inches.

In making a particular interlayer, wherein the vinyl has a width of 30 inches, the rate of unwinding and rinsing of the vinyl is 65 feet per minute. The slant height of each cone is 75 inches and the edge of the web having the gradient band 14 therealong passes over the cone at a distance of 10 inches from the small end thereof whereby the radius of curvature developed in the end having the gradient band therealong is 80 inches and the other end is 110 inches.

The web 12 passes from the rinsing station, not shown, over an idler roller and onto the surface of the drum 16. The drum is rotated through the driving motor 26 operating on gears 28 and 32. With this driving action the web is pulled from its continuous supply though the rinsing station and onto the surface of the drum. As is best seen in FIG. 2, the web is in contact with the drum surface along a substantial length thereof. During this contact, the web is heated to a temperature in the range of about 200°F by introducing a heating fluid such as steam under pressure through the inlet pipe 34 into the interior of the drum. The heating fluid heats the vinyl to a temperature whereat it is in a more pliable condition. The heating medium is exhausted from the interior of the drum through exhaust pipe 36. The web reaches its highest temperature at point A, that is the selected tangent position, where it is removed from the surface of the drum. At point A, the vinyl web is pliable enought to be stretched.

The pliable web 12 is stretched between tangent position A of the drum 16 and the selected slant height position B of the lower cooling cone 58. The stretching occurs between these positions because the points along the slant height of the cone into which the web comes into contact are moving at different velocities and thus apply different forces to the material across its width. The large end of the cone will be traveling at a greater surface speed and will stretch the web in that vicinity to a greater degree than the web is stretched by the small end of the cone. A small amount of necking down of the material takes place and this is generally confined to a location adjacent the tangent position A of the heat drum. The stretching force of the lower cooling cone is developed from motor 66 acting through the drive chain 68 to drive the cooling cone. Because of the geometry of the stretching zone as shown in FIG. 3 it is apparent that the only stretching forces placed on the web material are those caused by the rotational input of the motor to the lower cooling cone. There are no forces acting on the material as the result of angularly displaced positions for take off and landing of the vinyl material. Thus the stretching regime for the vinyl material can be accurately controlled and can be changed to a different regime with a minimum of effort. The heating and cooling of the web remains the same regardless of the stretching regime as adjustments do not have to be made to heating and cooling because of a change of positions of the material during stretching. Prior art apparatuses required a change in the geometry of the stretching to be made each time a different stretching regime was desired. This change in the geometrical shape of the stretching regime meant that adjustments had to be made also in the heating and cooling of the material and, as a result, there was no uniformity in the heating and cooling operations when stretching conditions were changed.

As the web passes over the cooling cones 58 and 60 its temperature is reduced to about 50°F. The web is removed from the upper cooling cone and cut into finite lengths. The web is cooled while in contact with the cooling cones by using a cooling fluid such as glycol which is introduced into the cooling cones through inlet pipes 59. The cooling fluid flows through the cones from the small end of the cones to the large end thereof by the use of internal baffels for directing the cooling fluid against the internal surface area of the cones in a known manner. The fluid is exhausted through the exhaust pipe 61. By cooling in this manner, the smaller end of each cone which contacts less surface area of the web per unit volume thereof has the coldest fluid and thus a better differential for heat transfer whereas the larger end of the cone has a reduced differential for heat transfer but has less of a cooling requirement because the unit volume to be cooled per unit surface area is less. In such a manner the vinyl web is heated, expanded and cooled prior to being cut into finite lengths.

There has been described herein an apparatus for stretching vinyl. The apparatus permits more uniform heating and cooling patterns to be applied to vinyl material and permits rapid changes between different stretching regimes without requiring extensive adjustments of those heating and cooling patterns. The vinyl is stretched in a stretching regime in which sufficient time is alloted between the heating of the material to a pliable condition and the cooling of the material to set it up to permit a stretching of the material without otherwise changing its physical properties. The expansion of the material is accomplished by applying a stretching force to the material which expands the same in a controlled manner not destroying certain polymer cross-links and other physical characteristics thereof such as elasticity and adhesion to glass. One may adjust the system to reach this desired stretching by observing the vinyl stretched under certain conditions. Vinyl which has been properly stretched does not have any defects therein such as localized thin spots, creases and/or fold marks. Vinyl material which has been properly stretched may be tested by laminating a test windshield to see if the material bonds properly and by subsequently fracturing such a windshield to see if the material functions in its normal manner by retaining the portions of glass adhered thereto.

Having described our invention, what we claim as our invention is the following.

1. An apparatus for expanding a continuous length of material so that originally parallel and straight lateral edges thereof are stretched to curved configurations of different arc lengths, which apparatus comprises:

a heat drum in the form of a cylinder;

first structure means for mounting said heat drum for rotation about its cylindrical axis;

heating means for supplying heat internally of said head drum;

first motor means for driving said heat drum so that said heat drum pulls said material from a continuous supply thereof and over a substantial portion of its cylindrical surface to heat the same to a temperature whereat it is a pliable condition;

a first cooling cone having a slant height greater than the width of said web of material;

second structure means for mounting said first cooling cone at a particular distance from said heat drum in a position such that a selected slant height position along said cooling cone is in a parallel spaced position with respect to a selected tangent position along the cylindrical surface of said heat drum whereby a rectangular plane is defined in said particular distance between said selected slant height position and said selected tangent position;

cooling means for cooling the interior of said cooling cone;

second motor means for driving said cooling cone;

drive means operative from said second motor means for driving said cooling cone means to apply a stretching force to said material between said head drum and said cooling cone, the portion of said web engaging the larger end of said cooling cone being stretched to a greater degree than the portion of said web material engaging the smaller end of said cooling cone, said web material leaving said heat drum at said selected tangent position, being subjected to stretching stresses and relieving of such stresses during movement across said particular distance and contacting said cooling cone at said selected slant height position, said particular distance being sufficient to permit a stretching of said material without otherwise changing its physical properties.

2. The apparatus of claim 1 wherein: said cooling means is for cooling the interior of said cooling cone from the small end thereof to the large end thereof whereby a greater thermal driving force is available for cooling in the area of the cone contacted by the material stretched to the lesser degree.

3. The apparatus of claim 1 wherein: additional cooling cones and cooling means are provided to assist the first cooling cone in cooling the web material.

* * * * *